United States Patent
Nanis (10) Patent No.: US 6,953,146 B2
(45) Date of Patent: Oct. 11, 2005

(54) LOW-TEMPERATURE FLUX FOR SOLDERING NICKEL-TITANIUM ALLOYS AND OTHER METALS

(76) Inventor: Leonard Nanis, 2114 Rosswood Dr., San Jose, CA (US) 95124

( * ) Notice: Subject to any disclaimer, the term of this patent is extended or adjusted under 35 U.S.C. 154(b) by 0 days.

(21) Appl. No.: 10/686,968

(22) Filed: Oct. 16, 2003

(65) Prior Publication Data

US 2005/0072837 A1 Apr. 7, 2005

Related U.S. Application Data (60) Provisional application No. 60/420,897, filed on Oct. 24, 2002.

(51) Int. Cl.[7] .......................... B23K 1/20; B23K 31/02
(52) U.S. Cl. ...................... 228/207; 228/206; 228/208; 134/2
(58) Field of Search ................................ 228/206–208; 134/2

(56) References Cited

U.S. PATENT DOCUMENTS

| | | | | |
|---|---|---|---|---|
| 2,569,097 A | * | 9/1951 | Grange et al. ............... | 427/311 |
| 2,818,075 A | * | 12/1957 | Dunlevy et al. ............... | 134/63 |
| 2,833,679 A | * | 5/1958 | Steinberg .................... | 148/242 |
| 2,991,195 A | * | 7/1961 | Quinn .......................... | 427/5 |
| 3,081,534 A | * | 3/1963 | Bredzs ........................ | 228/219 |
| 3,156,978 A | * | 11/1964 | Hanink et al. ............... | 228/207 |
| 3,625,900 A | * | 12/1971 | Shoemaker et al. ........ | 510/272 |
| 3,690,921 A | * | 9/1972 | Elmore ........................ | 427/299 |
| 4,504,324 A | * | 3/1985 | Furuno ........................ | 148/255 |
| 4,994,157 A | * | 2/1991 | Itoh et al. .................... | 205/710 |
| 5,242,759 A | | 9/1993 | Hall | |
| 5,354,623 A | | 10/1994 | Hall | |
| 5,505,786 A | * | 4/1996 | Cole et al. ...................... | 134/2 |
| 5,695,111 A | * | 12/1997 | Nanis et al. ................. | 228/206 |
| 5,939,774 A | * | 8/1999 | Yamada ........................ | 257/666 |
| 6,090,105 A | | 7/2000 | Zepeda et al. | |
| 6,183,828 B1 | * | 2/2001 | Starcke et al. .............. | 428/64.1 |
| 6,371,970 B1 | | 4/2002 | Khosravi et al. | |
| 6,379,818 B1 | * | 4/2002 | Mooij et al. ................. | 428/648 |
| 6,475,289 B2 | * | 11/2002 | Schilbe et al. ................. | 134/2 |
| 2002/0100493 A1 | * | 8/2002 | Kool et al. .................... | 134/3 |

FOREIGN PATENT DOCUMENTS

JP        10-121278 A    *    5/1998

OTHER PUBLICATIONS

Pelton, et al., pp. 395–400, Proceedings of the Second International Conference on Shape Memory and Superelastic Technologies, Mar. 1997; published by SMST, Santa Clara, CA, ISBN 0–9660508–1–9.

P. Hall, "Methods of Promoting Solder Wetting on Nitinol," p. 126, Proceedings of the Second International Conference on Shape Memory and Superelastic Technologies, Mar. 1997; published by SMST, Santa Clara, CA, ISBN 0–9660508–1–9.

Chapter 3 of "Scanning Electron Microscopy and X–Ray Microanalysis," Goldstein, Newbury, Exhlin, Joy, Fiori and Lifshin, Plenum Press, 1981, ISBN 0–306–40768–X.

* cited by examiner

Primary Examiner—Lynne R. Edmondson
(74) Attorney, Agent, or Firm—Mark A. Haynes; Haynes Beffel & Wolfeld LLP (57) ABSTRACT

A low-temperature flux is described which dissolves the refractory oxide layer from a shape memory alloy containing both nickel and titanium, such as Nitinol, and from other metals like stainless steel. The flux is particularly useful for preparing shape memory alloy members for soldering and permits joining of such members to other members, comprising, for example, stainless steel, used in structures like medical devices. The flux is a non-aqueous molten salt formulated on eutectic mixtures of KOH (potassium hydroxide), NaOH (sodium hydroxide) and LiOH (lithium hydroxide), with melting temperatures in a range from about 170° C. to about 226° C.

30 Claims, 2 Drawing Sheets

LOW-TEMPERATURE FLUX FOR SOLDERING NICKEL-TITANIUM ALLOYS AND OTHER METALS

REFERENCE TO RELATED APPLICATION

The benefit is hereby claimed of U.S. Provisional Patent Application No. 60/420,897, entitled Low-Temperature Flux for Soldering Nickel-Titanium Alloys and Other Metals With Surface Refractory Oxides, invented by Leonard Nanis, and filed on Oct. 24, 2002.

BACKGROUND OF THE INVENTION

1. Field of the Invention

The present invention relates to techniques for manufacturing components comprising shape memory alloys and other metals, and more particularly to soldering techniques and flux materials used in soldering.

2. Description of Related Art

In recent years, nickel-titanium shape memory alloys have found an increasing number of applications in medical devices where their unique properties permit the design of miniature structures for special purposes within arteries and elsewhere within the body. As described in U.S. Pat. No. 6,371,970, tiny nickel-titanium wire hoop forms may be tightly folded and then opened within an artery in order to act as the framework for a tiny net designed to capture plaque fragments dislodged from the artery wall into the blood stream during angioplasty procedures and thus prevent potential embolism.

In another type of application, described in U.S. Pat. No. 6,090,105, curved nickel-titanium memory alloy wires can be retracted within a straight trochar and, when in the body, extended to regain their pre-set curved form to act as electrodes for applying localized microwave energy to ablate tumors.

The novel flux of the present invention will add flexibility of design by permitting the joining of nickel-titanium alloys to other metal structural components of medical devices such as stainless steel.

The oxidation resistance of refractory metals may be attributed to the presence of naturally formed protective surface oxides (or oxygen containing compounds) which, when dense and adherent, shield the underlying metal from further oxidation. This quality is desirable in alloys designated for high temperature use. However, without mechanical removal or chemical dissolution by an applied liquid phase flux, the oxide skin also prevents the wetting of the refractory metal by low melting solder.

Acid-containing fluxes are frequently used to remove the oxide layer on various metals to promote wetting by low temperature (below 300° C.) solders such as conventional lead-tin mixtures, tin with 0 to 6% silver, and 80% gold-20% tin alloy.

For higher temperature joining of metals by brazing, surfaces are first cleaned of oxide by applying and heating a flux typically containing borate and fluoride salts. In brazing, the liquid flux permits molten filler metals such as copper-silver alloys to wet and flow on the surfaces of the parts being joined. In general, a problem arises when the temperature needed for proper fluxing is greater than a limiting temperature associated with preserving the mechanical properties of the metals involved.

The natural oxide formed on nickel-titanium alloys having unique shape memory or superelastic behavior (Nitinol, Elastinite) is not easily wetted by low temperature solders such as 80% gold-20% tin or 96% tin-4% silver. Accordingly, soldering to shape-memory alloys such as Nitinol presents special requirements. The melting temperature of the solder and the temperature for good fluxing action must be less than any annealing temperature previously applied to establish a desired shape for a device designed to utilize the unique memory properties of the nickel-titanium alloy. Certain acidic aqueous fluxes containing phosphoric acid satisfy the low temperature requirement but are known to cause embrittlement of the nickel-titanium alloy, presumably due to hydrogen produced by a cathodic reaction on the metal surface. Hydrogen embrittlement caused by heated phosphoric acid flux has been described by Pelton et al. (pages 395–400, Proceedings of the Second International Conference on Shape Memory and Superelastic Technologies, March 1997; published by SMST, Santa Clara Calif., ISBN 0-9660508-1-9).

In the present invention, the molten hydroxide eutectic is non-aqueous, so that free hydrogen ions are not available to act as a source for hydrogen embrittlement through electrochemical reaction.

Other fluxes clean Nitinol but require temperatures that can produce a loss or diminution of the desirable mechanical properties of the shape memory alloy. T. Hall, in U.S. Pat. No. 5,242,759 and U.S. Pat. No. 5,354,623, teaches a flux for soldering nickel-titanium alloys which is an aqueous paste mixture of organic amines, hydrofluoric or hydrochloric acid and various chloride salts wherein the mixture only becomes active at temperatures greater than 246° C. (475° F.).

Nanis et al. (U.S. Pat. No. 5,695,111) find that the cleaning of oxide from the surface of nickel-titanium alloy can be accomplished at temperatures as low as 170° C., the melting temperature of a sodium hydroxide-potassium hydroxide eutectic mixture. Nanis et al. teach a two-layer method in which a layer of liquid hydroxide flux is maintained over a layer of liquid 80% gold-20% tin solder alloy, which melts at 185° C. A part is first immersed in the flux layer for a specified time for oxide removal and is then more deeply immersed so as to make contact with the underlying layer of liquid gold-tin alloy solder. The gold-tin solder wets and coats the freshly cleaned nickel-titanium. After the part is withdrawn from the two-layer array, the solidified gold-tin solder layer provides an intermediary surface which is then wettable by other solder compositions, such as 95% tin-5% silver, for assembly of the nickel-titanium part in a device.

Another method for promoting adhesion of tin-silver solder is to electroplate the nickel-titanium surface with a metal known to be wettable by liquid solder. It is desirable that such plated metals have either no oxide layer of their own, or can be cleaned with conventional flux during soldering. Electroplated gold, nickel and other plated metals serve the purpose. However, as experienced in most plating systems, oxide removal and preliminary cleaning of the object to be plated is accomplished by a series of immersions in various etchants such as mixtures containing hydrofluoric and other acids. Hydrogen embrittlement is possible from such etch treatments.

Good plating practice requires that the part be transferred quickly into the plating tank after cleaning and rinsing steps in order to prevent re-oxidation. Thus, the burden falls on the plater to obtain good adhesion of the plated layer to the nickel-titanium substrate. The extra step of plating a solder-wettable layer adds to the expense and complexity of manufacture, particularly for small medical device parts which require special fixturing to assure good current distribution and electrical contact during plating.

Problems with the plating of nickel on nickel-titanium alloys have also been noted by P. Hall ("Methods of Promoting Solder Wetting on Nitinol", page 126, Proceedings of the Second International Conference on Shape Memory and Superelastic Technologies, March 1997; published by SMST, Santa Clara Calif. ISBN 0-9660508-1-9).

SUMMARY OF THE INVENTION

Oxides which form naturally on certain useful metals can be removed by a liquid flux to promote wetting of the underlying metal when molten solder is applied. The flux of this invention serves a threefold purpose: First, the metal oxide is dissolved by the molten hydroxide salt mixture at relatively low temperatures such as 230° C. Immersion of the refractory metal or alloy part in the molten salt may be brief, on the order of a minute or even less, for dissolution of the oxide skin on, for example, a Nitinol wire shape.

Second, upon withdrawing the metal part from the molten hydroxide salt, a layer of adhering salt rapidly freezes which then retards the oxygen of the atmosphere from re-oxidizing the clean metal surface.

Third, the adhering salt provides a source of flux to keep the metal surface clean during a subsequent soldering operation so that added solder may wet the metal surface and flow readily.

The melting temperature of the flux is below the range of temperatures which may adversely affect the mechanical properties of Nitinol. A previously thermally configured Nitinol part may thus be cleaned of oxide in the present flux, then protected from re-oxidation by adhering flux and then soldered in its final assembly position. Any surplus adhering remelted hydroxide flux may be easily washed off in water.

Alternately, the present two-step flux-tin method may be used to pre-coat or "tin" a part with solder. After washing off any residual adhering hydroxide flux, the pre-tinned part may then be attached to other metallic components by conventional soldering means. In the present invention, a thin film of liquid hydroxide flux adheres when the cleaned part is lifted from the molten hydroxide flux. The flux film rapidly solidifies and then serves both to retard re-oxidation of the metal and also to provide a flux source for subsequent solder application. A first flux immersion may be used to clean the Nitinol surface in preparation for adding a coating of tin metal by the method of electrolytic displacement in which the said cleaned Nitinol is immersed in a second molten hydroxide which also contains tin ions contributed from dissolved tin-bearing compounds such as tin oxide.

The two-layer method of Nanis et al. (U.S. Pat. No. 5,695,111) necessarily requires that flux cleaning and gold-tin solder coating be accomplished in a single container of test tube shape, positioned vertically as in an electrically heated tube furnace. Such an arrangement is not necessary in the present invention.

Whereas U.S. Pat. No. 5,695,111 mentions a process in which a Nitinol part is immersed in a multilayered bath, in a procedure involving immersing for a certain time in an upper hydroxide melt layer and then lowering directly into an underlying molten gold-tin layer (see column 9, lines 8–25), the present invention decouples cleaning from solder coating or from subsequent steps such as tinning by electrolytic displacement. Cleaning of the Nitinol surface in hydroxide flux is physically separated from contact of the cleaned surface with solder. The solder may be held in a separate container or may be applied as in conventional soldering with a soldering iron. Likewise, the molten salt for electrolytic displacement tinning may be held in a separate container. Time of immersion in flux and the flux temperature may be optimized independently of parameters in the solder application step or other subsequent steps such as electrolytic displacement tinning.

The present invention offers several practical and cost-saving advantages over the single container, single temperature, two-layer method of Nanis et al. (U.S. Pat. No. 5,695,111). The separate containers for flux and solder may be of different materials, each selected for maximum corrosion resistance. For the flux, nickel or stainless steel are known to withstand attack from molten hydroxides, which can corrode glass and ceramic materials such as porcelain. A pool of molten solder may be held in a corrosion-resistant ceramic crucible shape. As mentioned, the solder can be applied from a solid wire with a conventional heat source such as a soldering iron or flame, either for part assembly or for pre-coating ("tinning"). A tall form crucible of material capable of resisting attack by both flux and solder is thus not necessary, as required for the two-layer method of Nanis et al. (U.S. Pat. No. 5,695,111). Further, a simple electrical hot plate may be used in combination with standard low-form cup-shaped crucibles for improved accessibility.

A most important cost advantage of the present invention is that, in many instances, tin-silver solder may be added directly to a Nitinol part, thus avoiding pre-coating with a layer of 80% gold-20% tin or by electroplated nickel. Nitinol parts pre-coated with an intermediary layer of 80% gold-20% tin according to U.S. Pat. No. 5,695,111 are so treated to facilitate subsequent soldering with tin-silver alloys. However, the present invention provides cleaning of Nitinol which permits direct addition of silver-tin alloy to the Nitinol surface. It will be recognized that savings accrue if there is no need for a volume of expensive 80% gold-20% tin alloy maintained as the lower molten pool in the two-layer, single temperature method of U.S. Pat. No. 5,695,111.

Another advantage of the present invention in separating flux cleaning from solder coating is that the metal container can accommodate the stresses caused by the considerable volume expansion during re-melting of the hydroxide salt. At its melting temperature of 170° C., the solid-to-liquid transition of the NaOH—KOH eutectic is accompanied by a volume expansion of about 15 percent, typical of many ionic molten salts. Ceramic containers may crack if melting is constrained by surrounding solid salt. Cracking may be avoided by careful "top-down" reheating of a previously solidified melt. A ceramic or non-reactive crucible is preferable for holding molten hydroxides containing dissolved compounds added to provide ions for electrolytic displacement tinning.

It will also be recognized by those skilled in the art of soldering that the hydroxide melts of the present invention may provide a convenient source for adding fresh flux to the tip of a heated soldering iron. For this purpose, the pre-mixed salt may be molten or may also be used in solidified form. In addition, an amount of solid hydroxide flux may be pre-positioned locally on a structure which, when heated, cleans the metal and assists wetting by liquid solder.

Other aspects and advantages of the present invention can be seen on review of the drawings, the detailed description and the claims, which follow.

DETAILED DESCRIPTION

A detailed description of embodiments of the present invention is provided with reference to FIGS. 1–4.

Preparation or "pre-tinning" of Nitinol surfaces to facilitate soldering is accomplished in the present invention by dissolving surface oxides in low melting flux comprised of a eutectic mixture of hydroxide salts. The eutectic mixture of 59 weight percent potassium hydroxide (KOH) and 41 weight percent sodium hydroxide (NaOH) is effective. The KOH—NaOH eutectic mixture has a melting point less than either of its constituent hydroxides. The KOH—NaOH eutectic mixture melts at 170° C. compared with 318° C. for pure NaOH and 360° C. for pure KOH.

Another effective eutectic hydroxide mixture is comprised of 84 weight percent potassium hydroxide (KOH) and 16 weight percent lithium hydroxide (LiOH). The eutectic KOH—LiOH mixture has a melting temperature of 226° C., whereas pure LiOH melts at 471° C. and pure KOH at 360° C.

The eutectic mixtures may be prepared in several ways. For example, solid sodium hydroxide may be melted first, followed by addition of a known amount of potassium hydroxide. Alternately, dry pellets of each pure hydroxide may be mixed together mechanically and slowly heated to above the eutectic temperature. Liquification initiates at points of contact between hydroxide constituents as solid state diffusion creates a zone of eutectic composition. Porcelain, nickel or stainless steel crucibles may be used to contain the liquid flux. The crucible may be conveniently heated on a conventional laboratory electrical hot-plate.

Oxide cleaning action in the molten sodium-potassium hydroxide flux begins at temperatures greater than the 170° C. eutectic. A preferred method is to immerse Nitinol for one minute or less in a molten KOH—NaOH eutectic mixture maintained in the range of 230° C. to 280° C. At 280 C, there is no degradation of the mechanical properties of the nickel-titanium alloy.

Figure 1:
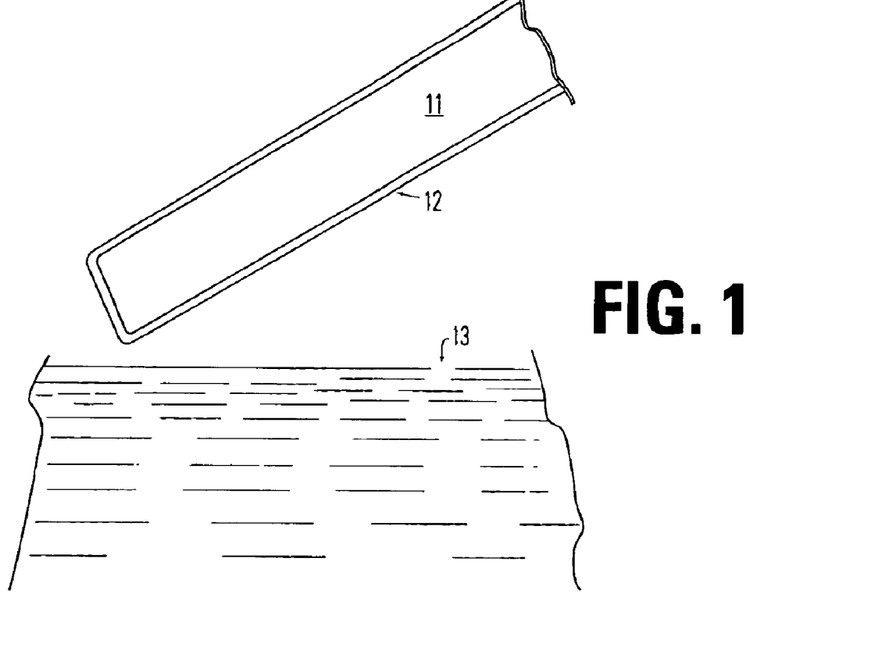
FIG. 1 illustrates a first step in a process according to the present invention in which a component having a refractory oxide is prepared to be dipped in a molten salt.

FIG. 1 represents a Nitinol nickel-titanium metal wire (11) with its initial natural oxide layer (12), poised above the molten hydroxide eutectic flux (13). Although said oxide layers are generally thin, measuring on the order of 10 to 1000 Angstroms, the thickness of the initial oxide layer shown in FIG. 1 is not drawn to scale, being exaggerated for the sake of clarity.

Figure 2:
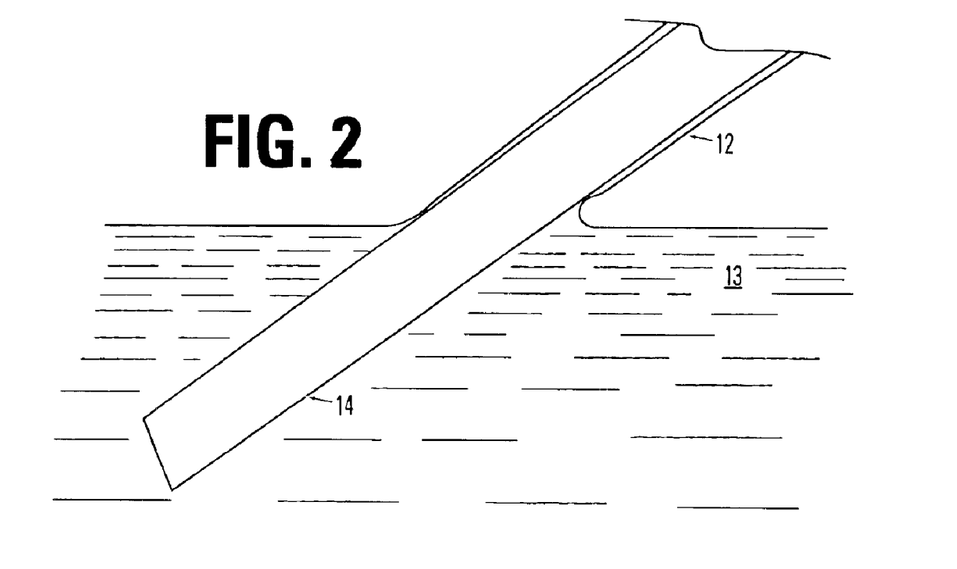
FIG. 2 illustrates a second step in a process according to the present invention in which the component is immersed in the molten salt.

FIG. 2 depicts Nitinol wire (11) after an end section (14) has been immersed in molten hydroxide eutectic flux (13) for a few minutes. The submerged Nitinol metal section (14) now has a clean surface since oxide layer (12) has dissolved into the molten hydroxide eutectic flux (13).

Figures 3, 4:
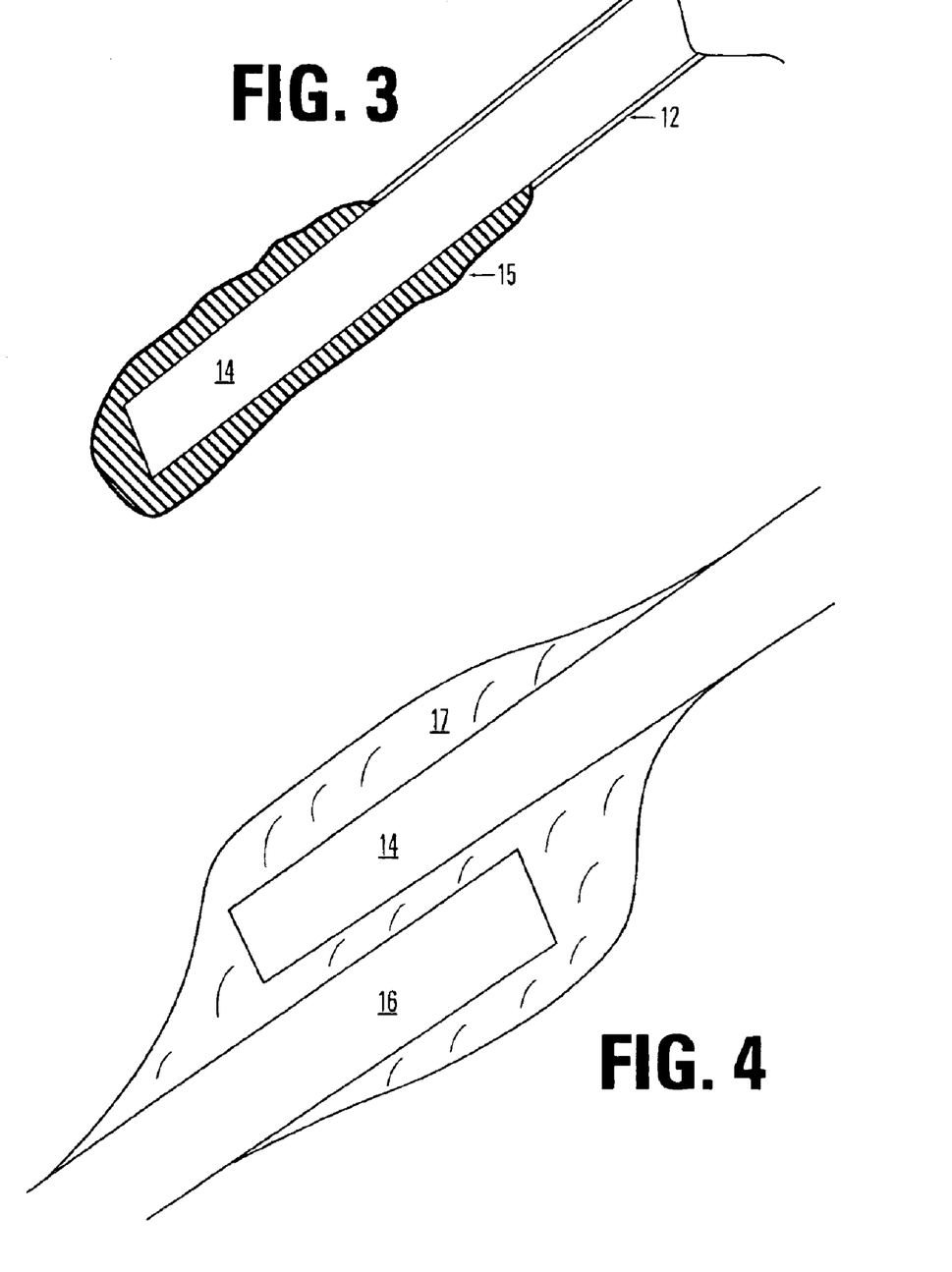
FIG. 3 illustrates a third step in a process according to the present invention in which the component is removed from the molten salt, with a frozen adhering layer of the salt on a surface.
FIG. 4 illustrates schematically the joining of the component to another member by soldering, during which the adhering layer of salt acts as a flux.

Upon removal of nickel-titanium alloy wire (11) with cleaned section (14) from the molten hydroxide eutectic flux (13), the adhering hydroxide layer (15) freezes rapidly, as indicated in FIG. 3. The frozen adhering hydroxide eutectic layer (15) acts to limit access of atmospheric oxygen to the cleaned region (14) and thus helps to retard re-oxidation. Said cleaned region (14) is wettable by liquid solder which may be applied for pre-tinning the surface (14) in preparation for subsequent soldering operations. When wire (11) with its cleaned section (14) is reheated, the adhering solidified hydroxide flux layer (15) remelts and serves to keep wire section (14) free of oxide, thus permitting added solder to wet the metal surface either for pre-tinning or for final assembly soldering. Solidified layer (15) also protects the Nitinol surface in transit to a subsequent step such as a second melt containing tin ions for the purpose of electrolytic displacement tinning. Adhering layer (15) remelts readily into the second melt of similar composition.

Immersion times ranging from a few seconds to about three minutes are effective in removing sufficient oxide from the nickel-titanium alloy to permit full or at least partial coverage by tin-based solder when the chilled eutectic KOH—NaOH layer (15) is reheated to serve as a solder flux. The shape and volume of the molten salt containing crucible and the positioning of the part may be selected so that wires and small shapes may be cleaned and tinned completely or only in a specified region. Parts may be stored in a dessicator to prevent moisture pick-up by the solid salt while awaiting conventional soldering operations. FIG. 4 illustrates a final step in manufacturing a device using the soldering technique just described, in which a member (16) is joined to component (14), by application of solder (17), where the frozen adhering flux is reheated and acts as a flux during application of the solder (17).

The 170° C. melt temperature of the KOH—NaOH eutectic mixture is well below the 232° C. melting temperature of pure tin and the 221° C. melt temperature of a typical tin-silver solder with up to 5 weight percent silver. When used as a frozen layer and flux source during soldering, the remelted salt continues to clean the surface by dissolving any oxide that may tend to reform. When soldering is complete, any cooled hydroxide salt may be removed by washing the joined part in warm water. The rinse water will become alkaline but may be readily neutralized with a mineral acid such as hydrochloric acid. The neutralized rinse water is then a harmless salt solution, non-toxic and non-corrosive and may thus be safely disposed of in a sanitary waste line.

FIGURE OF MERIT FOR MEASURING SOLDER COVERAGE ON NITINOL

For quantifying the degree of solder wetting and coating on Nitinol for our examples, I use a figure-of-merit obtained from the energy dispersive X-ray spectrum of our treated surfaces. Coverage of solder on Nitinol may be represented as the ratio of energy dispersive X-ray (EDX) spectrum peak height for tin in the solder to the sum of said peak height for tin plus the peak height for titanium in Nitinol. Background energy in the EDX scan of intensity versus X-ray energy should be subtracted from the peak heights, designated as Sn and Ti, for the ratio $$Sn/(Sn+Ti).$$

Scanning electron microscopy (SEM) coupled with energy dispersive X-ray analysis (EDX) is a well-known method for element analysis of regions on or close to a surface. Our SEM is a Hitachi Corp. S-2400 outfitted with an EDAX Corp. DX4 energy dispersive X-ray detection system.

In EDX mode, the electron beam of the SEM hits the sample and produces X-rays which have energies characteristic of the elements present in the sample. X-rays are produced within a small volume of the sample so that the detected emerging X-ray energies represent an average composition of the surface and of material close to the surface. Typically, an SEM electron beam energy of 10 kiloVolts will activate X-rays from material to a depth of about 1500 to 3000 Angstrom.

Although the entire integrated EDX spectrum plot of intensity of emitted X-rays versus X-ray energy may be analyzed for a quantitative assay of elements in the sample depth, the peak heights (conveniently measured with a millimeter scale) offer a less rigorous but conveniently measured indicator of the amount of each element present in the activated sample volume.

For Nitinol covered by tin-silver solder, the heights of X-ray intensity peaks (above the spectrum background) for the main emitted energies for tin (L-alpha at 3.41 keV) and for titanium (K-alpha at 4.51 keV) are suitably used. The Sn/(Sn+Ti) ratio ranges from 0 to 1.

The depth and shape of the X-ray-producing volume of material energized by the incoming SEM electron beam depends on a complex interplay of several factors such as initial beam energy, X-ray absorption cross section of target components and scattering of electrons within the volume. A detailed discussion of electron beam-specimen interactions that affect sampling depth may be found in Chapter 3 of "Scanning Electron Microscopy and X-Ray Microanalysis", Goldstein, Newbury, Echlin, Joy, Fiori and Lifshin, Plenum Press, 1981, ISBN 0-306-40768-X.

From a simplified viewpoint sufficient to define a figure of merit for the results of my invention, it is helpful to consider that if Nitinol is completely covered by a sufficiently thick layer of solder, i.e. approximately 10,000 Angstrom deep, the energy of the incoming electron beam of the SEM and of emerging X-rays produced within the solder sampling depth will be attenuated so that no underlying Nitinol will be activated to contribute X-ray energies characteristic of titanium or of nickel. The EDX spectrum will consist only of lines for tin (and silver). For a thick layer of solder and the absence of a titanium contribution to the EDX spectrum, the Sn/(Sn+Ti) ratio will be equal to unity.

When solder uniformly coats the underlying Nitinol, the Sn/(Sn+Ti) ratio is a relative measure of solder thickness. For a uniform but very thin layer of solder, the Sn/(Sn+Ti) ratio will trend to zero since there will be a greater contribution to the X-rays activated from the comparatively large amount of titanium in the underlying Nitinol. The Sn/(Sn+Ti) ratio is not a direct measure of solder thickness but does provide a means to gauge the uniformity of coverage by obtaining the EDX spectrum from adjacent regions on the surface. Partial coverage of a poorly wetted surface can readily be detected in the SEM image. Also, the Sn/(Sn+Ti) figure of merit will be zero for unwetted areas and unity for attached but unspread, relatively thick patches of solder.

EXAMPLE 1

In my invention, as an example of decoupling the oxide cleaning step from the solder coating step, Nitinol pre-cleaned by immersion in hydroxide flux at one specified temperature may be later brought into contact with a liquid solder pool at a different temperature. The adhering layer of flux which cools on the Nitinol part as it is withdrawn from the cleaning flux then remelts as it contacts liquid solder held in a separate container.

Table 1 lists representative results of such two-step treatments with Nitinol and a cleaning flux of eutectic mixture of 41 weight percent sodium hydroxide and 59 weight percent potassium hydroxide, 170° C. melting temperature. The liquid solder pool in the second container was nominally 3.5 weight percent silver, 96.5 weight percent tin ("Stay-Brite", J. W. Harris Co., Inc., Mason, Ohio). Pure tin was also used, as noted in Table 1. Nitinol was in the form of wire ranging from 0.005 to 0.015 inch diameter, of nominal composition 55 weight percent nickel, 45 weight percent titanium, supplied by Small Parts, Inc., Miami Lakes, Fla. For convenience, porcelain crucibles were used to contain both cleaning flux and also the solder pool. Dross was mechanically scraped from the solder pool surface before immersing flux-cleaned Nitinol. Temperatures were measured with a chromel-alumel thermocouple. The only pre-treatment of parts was degreasing with isopropyl alcohol.

TABLE 1

Flux Cleaning and Solder Coating
Nitinol, KOH—NaOH eutectic flux, 96.5Sn—3.5Ag solder

| Flux-Cleaning | | | Solder-Dip | | |
|---|---|---|---|---|---|
| temp., C. | time, sec. | Storage Time min. | temp., C. | time, sec | EDX Sn/(Sn + Ti) |
| — | — | — | 292 | 30 | 0.0, 0.98 (not wet) |
| 245 | 3 | — | 262 | 30 | 0.05, 0.06 (not wet) |
| 236 | 30 | — | 260 | 30 | 0.12, 0.08, 0.09, 0.10 |
| 226 | 30 | — | 292 | 30 | 0.65 |
| 229 | 60 | — | 292 | 30 | 0.72 |
| 234 | 60 | 10 | 290 | 30 | 0.68, 0.42 |
| 236 | 60 | 30 | 292 | 30 | 0.47, 0.88, 0.98 |
| 240 | 60 | — | 280 | 60 | 0.84, 0.80, 0.78 (tin) |
| 240 | 180 | — | 287 | 90 | 0.77 (tin) |
| 263 | 180 | — | 287 | 90 | 0.76, 0.78, 0.74 |
| 253 | 300 | — | 277 | 30 | 0.34, 0.32, 0.39, 0.45 |

Most of the Nitinol parts were immersed in the solder pool immediately after flux cleaning. As indicated in Table 1, a few parts were stored for several minutes in air at room temperature. Good coverage by solder was obtained for flux cleaning times of at least 30 seconds. The individual values of Sn/(Sn+Ti) ratio figure of merit in Table 1 are from separate EDX spectra obtained from nearby locations on the solder-coated Nitinol surface. The Nitinol part that received no flux cleaning had Sn/(Sn+Ti) ratios of 0.0 and 0.98 after immersion in the solder pool for 30 seconds at 292° C. The ratio 0.98 is from an isolated patch of solder that adhered to the Nitinol but whose boundaries did not exhibit the small contact angle characteristic of good wetting. From the data for 30 second flux immersion, a solder temperature of 292° C. gave a thicker solder coating compared with solder at 260° C. Good coatings were also obtained for flux-dipped parts stored for up to 30 minutes in air. It will be recognized by those skilled in the art of soldering that other combinations of times and temperatures for both flux immersion and solder immersion may be varied in order to optimize the solder coating for a particular application. The results shown in Table 1 indicate that tin-silver solder may be directly applied to Nitinol without the need of an intermediary layer such as electroplated nickel or gold-tin alloy added by the two-layer method described by Nanis et al. U.S. Pat. No. 5,695,111.

EXAMPLE 2

Flux cleaning of Nitinol followed by contact with a solder pool was also performed with a low melting KOH—LiOH eutectic mixture comprised of 16 weight percent lithium hydroxide and 84 weight percent potassium hydroxide, with a melt temperature of 226° C. Representative results are shown in Table 2. The procedure was the same as for Example 1.

TABLE 2

Flux Cleaning and Solder Coating
Nitinol, LiOH—KOH eutectic, 96.5Sn—3.5Ag solder

| Flux-Cleaning | | | Solder-Dip | | |
|---|---|---|---|---|---|
| temp., C. | time, sec. | Storage Time min. | temp., C. | time, sec | EDX Sn/(Sn + Ti) |
| 246 | 6 | — | 287 | 30 | 0.47, 0.70, 1.0, 0.76 |
| 235 | 30 | — | 287 | 30 | 0.57, 0.54 |
| 235 | 60 | — | 287 | 30 | 0.63, 0.57 |
| 248 | 60 | 10 | 285 | 30 | 0.33, 0.46, 0.53, 1.0 |

The LiOH—KOH flux cleans effectively even close to the eutectic melting temperature of 226° C. and in general, offers a slight improvement over the NaOH—KOH melt. It will be obvious to those skilled in the art of fluxes and molten salts that ternary mixtures comprised of NaOH—KOH—LiOH may be formulated which provide improved rapid cleaning of Nitinol at temperatures below those reported in Examples 1 and 2. Further, the pure hydroxide salts may also be used for flux cleaning, provided their higher melting temperatures do not degrade the mechanical properties of Nitinol or other metals being so cleaned.

The results shown in Table 2 also indicate that the fluxes of my invention permit tin-silver solder to be directly applied to Nitinol without the use of an intermediary layer.

EXAMPLE 3

The hydroxide flux of my invention may also be used for conventional soldering in which a part is heated, fluxed and then solder applied to form a bond between metal parts. Example 3 concerns pre-coated NaOH—KOH eutectic as a flux for conventional soldering with an applied heat source such as a soldering iron.

A solid flux coating was obtained on Nitinol wires by briefly immersing the Nitinol piece in the molten hydroxide eutectic described in Example 1. Adhering flux solidified upon removal from the melt and was remelted when solder was added to the flux-coated piece. A silver-tin alloy solder, 97.5 weight percent tin, 2.5 weight percent silver, was fed to the heated work piece in the form of solid wire.

Heat was provided by a programmable electric solder iron (Weller Model WSD80), set to a predetermined temperature of 428° C. (803° F.). The Nitinol wires, coated with solidified flux, were manually held in contact with the tip of the solder iron as solder in wire form was fed onto the heated tip and on to the Nitinol. Coverage of solder on said coated Nitinol was evaluated by examining SEM images and by determining the EDX spectrum for use with the peak height ratio Sn/(Sn+Ti), as described in Examples 1 and 2. Results shown in Table 3 indicate good coverage is obtained with Nitinol pre-coated with NaOH—KOH eutectic when used with a conventional soldering iron as the heat source. Immersion of the Nitinol in molten NaOH—KOH flux cleans the surface. The adhering frozen flux protects the clean surface from oxidation and, as it remelts in the soldering procedure, continues to keep the surface clean while solder wets and spreads on the Nitinol.

TABLE 3

Soldering on Flux Cleaned and Coated Nitinol
NaOH—KOH flux, 97.5Sn—2.5Ag solder
Electric soldering iron, 428 C.

| Nitinol wire diameter inch | Flux Immersion | | |
|---|---|---|---|
| | Temp., C. | Time, min. | EDX Sn/(Sn + Ti) |
| 0.005 | 260 | 1.0 | 0.43, 0.51, 0.30, 0.81 |
| 0.013 | 250 | 1.0 | 0.18, 0.49 |
| 0.013 | 250 | 4.0 | 0.58, 0.31, 0.70 |

EXAMPLE 4

The flux of my invention is not limited to Nitinol but cleans other metals in preparation for soldering and tinning. Stainless steel is of interest because it is frequently used in various forms for medical devices.

Representative times and temperatures for flux and solder immersion of type 316L stainless tubing are shown in Table 4. In the figure-of-merit EDX intensity ratio for solder coverage on 316L stainless steel, the chromium K-alpha line at 5.42 keV is conveniently located in the X-ray spectrum for comparison with the main tin line (L-alpha) at 3.41 keV. Type 316L stainless steel was annealed coronary tubing, 0.062 inch OD, 0.051 inch ID, Superior Tube Corp. Tubing was cleaned before use by wiping with isopropyl alcohol. Eutectic hydroxide flux mixtures were as described in Examples 1 and 2.

There was very little wetting by solder for 316L tubing that was not flux cleaned. Solder coverage was in a few isolated patches occupying only 5 percent of the surface. The first entry in Table 4 thus serves as a reference surface. All other time-temperature-hydroxide combinations produced excellent coverage. In general, flux cleaning is rapid, requiring only a few seconds in the temperature range 240° to 250° C.

TABLE 4

Flux Cleaning and Solder Coating
316L Stainless Steel, Hydroxide eutectic
fluxes, 96.5Sn—3.5Ag solder

| | Flux-Cleaning | | Solder-Dip | | |
|---|---|---|---|---|---|
| Type | Temp., C. | time, sec | Temp., C. | time, sec | EDX Sn/(Sn + Cr) |
| NaOH—KOH | — | — | 290 | 30 | 0.0, 1.0(poor wetting) |
| " | 240 | 3 | 240 | 30 | 1.0 |
| " | 238 | 6 | 268 | 30 | 1.0 |
| " | 245 | 30 | 268 | 30 | 1.0 |
| " | 248 | 6 | 285 | 30 | 0.85, 0.99 |
| " | 248 | 30 | 268 | 30 | 1.0, 0.92, 0.96 |
| KOH—LiOH | 248 | 6 | 285 | 30 | 0.85, 0.98 |
| " | 248 | 30 | 285 | 30 | 0.92, 0.96, 1.0 |

EXAMPLE 5

The hydroxide flux of my invention may be used for pre-cleaning Nitinol in preparation for an electrolytic displacement reaction to deposit tin metal on the Nitinol surface. The displacement reaction takes place in a second molten salt serving as a solvent electrolyte for dissolved tin ions. The displacement reaction causes a layer of tin metal to plate automatically onto the flux-cleaned Nitinol surface.

Accordingly, immersion in a pool of molten tin metal is not necessary, as for Examples 1 and 2 cited above.

We have discovered that a layer of tin metal will deposit on Nitinol when the flux-cleaned Nitinol is then immersed in a second crucible containing a molten salt of similar hydroxide chemistry to which has been added tin oxide. The benefit of protection against re-oxidation of the surface is provided by the adhering frozen hydroxide as shown in FIG. 3.

Solid tin oxide dissolves in the hydroxide molten salt and thereby provides tin in an ionic form which may then enter electrochemical reaction to deposit a layer of tin on the Nitinol. By the principles of electrochemical systems, the tin ions may be considered as participating in a so-called displacement reaction in which the tin ions are reduced to metallic tin on the surface of the Nitinol. In such displacement reactions, an electropositive metal will deposit, "displacing" an electronegative metal which then dissolves into the electrolyte; in this case, the molten hydroxide salt. The electrons which discharge and neutralize the tin ions are provided in a balanced manner from the electronegative metal as it becomes a positively charged species dissolved in the molten ionic hydroxide salt.

The exact reaction mechanism and reaction kinetics underlying the finding of our invention are not presently known. Equally, an equilibrium electromotive force scale is not known for ions dissolved in molten hydroxide salts in order to designate which metal-ion combinations are most electropositive. The order of metal-ion pairs is not necessarily the same as in the well-known electromotive force series for aqueous electrolytes. However, our invention usefully demonstrates that tin-containing ions accept electrons and are automatically reduced to tin metal on the Nitinol surface. Tin is thus the electropositive metal of the displacement reaction in the molten hydroxide solvent. Titanium in the Nitinol alloy may be the electronegative metal but this is not presently certain. Tin exists in the tetravalent state (4+) in tin oxide, with formula $SnO_2$, and also in a divalent state (2+) in another oxide with formula $SnO$. Both oxides dissolve to some extent in molten hydroxide flux and each oxide is effective in supplying tin ions for a displacement type of reaction to form a tin metal layer on Nitinol.

The initial immersion in hydroxide flux, as shown in FIG. 2, is considered to dissolve the naturally occurring oxide skin from Nitinol, thus cleaning the surface which is then better prepared to participate in the displacement reaction when immersed in the second hydroxide containing dissolved tin oxide. Some degree of metallic tin deposition can also be obtained by immersing Nitinol in only a single melt, namely the hydroxide melt with dissolved tin oxide since, in principle, the naturally occurring oxides on Nitinol dissolve in the melt acting as flux while the displacement reaction proceeds on the freshly cleaned Nitinol with the same melt also functioning as a solvent electrolyte.

As shown in Table 5, improved tin coating is obtained with pre-cleaning. Whereas the Sn/(Sn+Ti) figure of merit is an average 0.1 without pre-cleaning, improvement is obtained with a pre-cleaning flux immersion, with better results as the pre-cleaning immersion temperature is increased from 224 C to about 270 C.

TABLE 5

Flux Cleaning and Electrolytic Displacement Tinning of Nitinol NaOH—KOH eutectic cleaning flux; NaOH—KOH-tin oxide displacement melt (10 percent by weight tin oxide added to eutectic NaOH—KOH)

| Flux-cleaning | | Displacement | | | |
|---|---|---|---|---|---|
| temp., C. | time, sec | temp., C. | time sec | Tin Oxide valence | EDX Sn/(Sn + Ti) |
| — | — | 261 | 60 | 4+ | 0.07, 0.22, 0.13, 0.11, 0.03 |
| 224 | 60 | 236 | 60 | 4+ | 0.09 |
| 224 | 180 | 236 | 60 | 4+ | 0.21, 0.10, 0.24 |
| 258 | 30 | 267 | 180 | 4+ | 0.23, 0.50, 0.48, 0.28 |
| 268 | 30 | 267 | 180 | 4+ | 0.51 |
| 268 | 60 | 267 | 180 | 4+ | 0.48, 0.14, 0.36 |
| 270 | 120 | 257 | 120 | 4+ | 0.53 |
| 270 | 120 | 273 | 120 | 4+ | 0.51, 0.53, 0.32, 0.34 |
| 268 | 180 | 264 | 180 | 4+ | 0.31, 0.26, 0.25 |
| 224 | 60 | 239 | 60 | 2+ | 0.19, 0.18, 0.13, 0.19 |
| 224 | 180 | 239 | 180 | 2+ | 0.24 |

As noted in the caption for Table 5, melts containing either tetravalent or divalent tin oxide are prepared by adding 10 weight percent of oxide to a NaOH—KOH eutectic mixture. The actual amount which goes into solution at each temperature is not presently known. As in Tables 1–4, multiple values of the Sn/(Sn+Ti) figure of merit indicate EDX data obtained at several locations on a surface.

The method of Example 5 of pre-cleaning followed by displacement tinning provides sufficient tin on the Nitinol surface to promote wetting in a subsequent soldering step. Those familiar with electrochemical practice will recognize that the molten hydroxide electrolyte containing dissolved tin ions can serve as a conventional plating solution. Rather than relying only the displacement reaction to deposit tin metal, tin plating may be assisted by an applied voltage from a direct current power supply in a circuit in which the Nitinol is made cathodic and an anodic counter electrode is provided.

In general, according to the electrochemistry of displacement reactions, molten hydroxide salts and mixtures thereof can serve as the solvent for tin ions and also for the ions of other metals. The source of the metal ions may be dissolved oxides, as in the example of tin, or may be other types of salt compounds such as halides, providing there is solubility of said compounds in the molten hydroxide. Tin ions will also deposit as metallic tin on other relatively electronegative metals by displacement reaction. In addition, alloying elements may be co-deposited with tin, depending on their relative electronegativity and concentration of dissolved ions.

While my invention has been described in examples with specific embodiments, those skilled in the art will recognize that variations can be made with regard to details without departing from the spirit and scope of the invention. For example, low-melting eutectic hydroxide fluxes may be used to clean the oxide layer from other metals of interest for tinning or soldering. In addition, the hydroxide flux may also be applied in solid or paste form suitable for remelting. Also, it will be recognized that a partially coated surface may be improved by re-immersion of the part in molten flux, thus permitting additional cleaning of oxide and better wetting of the recleaned surface by remelted solder. Accordingly, all such variations come within the present invention.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method to clean refractory oxides from a surface of a component comprising metals or metal alloys, including
   immersing of the surface of the component in a molten salt which dissolves a refractory oxide on said surface; and
   removing the component from the molten salt with salt adhering to the surface which then rapidly solidifies and acts as a shield to retard re-oxidation of the surface in which the molten salt comprises a mixture of alkaline hydroxides in a low melting eutectic composition and the eutectic composition is comprised of lithium hydroxide and potassium hydroxide, mixed in the proportions of 84 weight percent potassium hydroxide and 16 weight percent lithium hydroxide.

2. A method for manufacturing a device including a component comprising metals or metal alloys, including:
   immersing of the surface of the component in a molten salt which dissolves a refractory oxide on said surface, wherein the molten salt comprises a mixture of alkaline hydroxides in a low melting eutectic or near-eutectic composition;
   removing the component from the molten salt with salt adhering to the surface which then rapidly solidifies and acts as a shield to retard re-oxidation of the surface;
   heating and applying a solder on the surface of the component, wherein the adhering salt on the surface melts and serves as a flux; and
   joining the component to another member using the solder.

3. The method of claim 2 in which the mixture of alkaline hydroxides includes an essentially pure potassium hydroxide and essentially pure sodium hydroxide, mixed in the proportions of about 59 weight percent potassium hydroxide and about 41 weight percent sodium hydroxide.

4. A method for manufacturing a device including a component comprising metals or metal alloys, including:
   immersing of the surface of the component in a molten salt which dissolves a refractory oxide on said surface;
   removing the component from the molten salt with salt adhering to the surface which then rapidly solidifies and acts as a shield to retard re-oxidation of the surface;
   heating and applying a solder on the surface of the component, wherein the adhering salt on the surface melts and serves as a flux; and
   joining the component to another member using the solder, wherein the metal or metal alloy is characterized by a critical annealing or transition temperature, and in which the molten salt comprises an essentially pure hydroxide or a mixture of two or more essentially pure hydroxides with a melting temperature below the critical annealing or transition temperature.

5. The method of claim 4, in which the molten salt comprises an essentially pure hydroxide with a melting temperature below the critical annealing or transition temperature, the essentially pure hydroxide being a member of a group including sodium hydroxide, potassium hydroxide, and lithium hydroxide.

6. A method for manufacturing a device including a component comprising metals or metal alloys, including:
   immersing of the surface of the component in a molten salt which dissolves a refractory oxide on said surface;
   removing the component from the molten salt with salt adhering to the surface which then rapidly solidifies and acts as a shield to retard re-oxidation of the surface;
   heating and applying a solder on the surface of the component wherein the adhering salt on the surface melts and serves as a flux; and
   joining the component to another member using the solder, in which the molten salt comprises a low melting mixture of two or more essentially pure hydroxide salts.

7. The method of claim 6, in which the eutectic composition is comprised of lithium hydroxide and potassium hydroxide, mixed in the proportions of 84 weight percent potassium hydroxide and 16 weight percent lithium hydroxide.

8. The method of claim 2 in which the solder material comprises essentially pure tin.

9. A method for manufacturing a device including a component comprising metals or metal alloys, including:
   immersing of the surface of the component in a molten salt which dissolves a refractory oxide on said surface;
   removing the component from the molten salt with salt adhering to the surface which then rapidly solidifies and acts as a shield to retard re-oxidation of the surface;
   heating and applying a solder on the surface of the component, wherein the adhering salt on the surface melts and serves as a flux; and
   joining the component to another member using the solder, in which the solder material comprises an alloy nominally comprised of tin and silver, nominally with a range from just over 0 to about 6 weight percent silver.

10. A method for manufacturing a device including a component comprising metals or metal alloys, including:
    immersing of the surface of the component in a molten salt which dissolves a refractory oxide on said surface;
    removing the component from the molten salt with salt adhering to the surface which then rapidly solidifies and acts as a shield to retard re-oxidation of the surface;
    heating and applying a solder on the surface of the component, wherein the adhering salt on the surface melts and serves as a flux; and
    joining the component to another member using the solder, in which the solder material comprises an alloy of gold and tin, nominally 80 weight percent gold, 20 weight percent tin.

11. A method for manufacturing a device including a component comprising metals or metal alloys, including:
    immersing of the surface of the component in a molten salt which dissolves a refractory oxide on said surface;
    removing the component from the molten salt with salt adhering to the surface which then rapidly solidifies and acts as a shield to retard re-oxidation of the surface;
    heating and applying a solder on the surface of the component, wherein the adhering salt on the surface melts and serves as a flux; and
    joining the component to another member using the solder, in which the solder material comprises an alloy in which principal materials comprise lead and tin in various proportions.

12. A method for manufacturing a device including a component comprising metals or metal alloys, including:

immersing of the surface of the component in a molten salt which dissolves a refractory oxide on said surface;

removing the component from the molten salt with salt adhering to the surface which then rapidly solidifies and acts as a shield to retard re-oxidation of the surface;

heating and applying a solder on the surface of the component, wherein the adhering salt on the surface melts and serves as a flux; and joining the component to another member using the solder, in which the surface of the component comprises a superelastic or shape memory type nickel-titanium alloy with a composition at or near 50 weight percent of each component.

13. A method for manufacturing a device including a component comprising metals or metal alloys, including:

immersing of the surface of the component in a molten salt which dissolves a refractory oxide on said surface;

removing the component from the molten salt with salt adhering to the surface which then rapidly solidifies and acts as a shield to retard re-oxidation of the surface;

heating and applying a solder on the surface of the component, wherein the adhering salt on the surface melts and serves as a flux; and joining the component to another member using the solder, in which the surface of the component comprises a stainless steel or similar alloy whose major constituent is iron together with chromium and nickel in various proportions.

14. A method for manufacturing a device including a component comprising metals or metal alloys, including:

immersing of the surface of the component in a first molten salt which acts as a flux to dissolve refractory oxide on said component;

removing the component from the first molten salt with salt adhering to the surface which then rapidly solidifies and acts as a shield to retard re-oxidation of the surface; and with said salt adhering to the surface of the component, immersing the component in a second molten salt containing dissolved ions of a metal more electropositive than the metals or metal alloys of the component to obtain a layer of the electropositive metal plated on the surface of the component as a result of electrolytic displacement reaction.

15. A method for manufacturing a device including a component comprising metals or metal alloys, including:

immersing of the surface of the component in a first molten salt which acts as a flux to dissolve refractory oxide on said component;

removing the component from the first molten salt with salt adhering to the surface which then rapidly solidifies and acts as a shield to retard re-oxidation of the surface; and immersing the component in a second molten salt containing dissolved ions of a metal more electropositive than the metals or metal alloys of the component to obtain a layer of the electropositive metal plated on the surface of the component as a result of electrolytic displacement reaction, in which the first molten salt comprises a mixture of alkaline hydroxides in a low melting eutectic or near-eutectic composition.

16. A method for manufacturing a device including a component comprising metals or metal alloys, including:

immersing of the surface of the component in a first molten salt which acts as a flux to dissolve refractory oxide on said component;

removing the component from the first molten salt with salt adhering to the surface which then rapidly solidifies and acts as a shield to retard re-oxidation of the surface; and immersing the component in a second molten salt containing dissolved ions of a metal more electropositive than the metals or metal alloys of the component to obtain a layer of the electropositive metal plated on the surface of the component as a result of electrolytic displacement reaction, wherein the metal or metal alloy component is characterized by a critical annealing or transition temperature, and in which the first molten salt comprises an essentially pure hydroxide or a mixture of two or more essentially pure hydroxides with a melting temperature below the critical annealing or transition temperature.

17. The method of claim 15, in which the first mixture of alkaline hydroxides includes an essentially pure potassium hydroxide and essentially pure sodium hydroxide, mixed in the proportions of about 59 weight percent potassium hydroxide and about 41 weight percent sodium hydroxide.

18. The method of claim 16 in which the first molten salt comprises an essentially pure hydroxide with a melting temperature below the critical annealing or transition temperature, the essentially pure hydroxide being a member of a group including sodium hydroxide, potassium hydroxide, and lithium hydroxide.

19. The method of claim 15, in which the first molten salt is a eutectic composition comprised of lithium hydroxide and potassium hydroxide, mixed in the proportions of 84 weight percent potassium hydroxide and 16 weight percent lithium hydroxide.

20. A method for manufacturing a device including a component comprising metals or metal alloys, including:

immersing of the surface of the component in a first molten salt which acts as a flux to dissolve refractory oxide on said component;

removing the component from the first molten salt with salt adhering to the surface which then rapidly solidifies and acts as a shield to retard re-oxidation of the surface; and immersing the component in a second molten salt containing dissolved ions of a metal more electropositive than the metals or metal alloys of the component to obtain a layer of the electropositive metal plated on the surface of the component as a result of electrolytic displacement reaction, in which the surface of the component comprises a superelastic or shape memory type nickel-titanium alloy with a composition at or near 50 weight percent of each component.

21. A method for manufacturing a device including a component comprising metals or metal alloys, including:

immersing of the surface of the component in a first molten salt which acts as a flux to dissolve refractory oxide on said component;

removing the component from the first molten salt with salt adhering to the surface which then rapidly solidifies and acts as a shield to retard re-oxidation of the surface; and immersing the component in a second molten salt containing dissolved ions of a metal more electropositive than the metals or metal alloys of the component to obtain a layer of the electropositive metal plated on the surface of the component as a result of electrolytic displacement reaction, in which ions of the electropositive metal are introduced into the second molten salt by dissolving therein compounds of said metal.

22. A method for manufacturing a device including a component comprising metals or metal alloys, including:
- immersing of the surface of the component in a first molten salt which acts as a flux to dissolve refractory oxide on said component;
- removing the component from the first molten salt with salt adhering to the surface which then rapidly solidifies and acts as a shield to retard re-oxidation of the surface; and
- immersing the component in a second molten salt containing dissolved ions of a metal more electropositive than the metals or metal alloys of the component to obtain a layer of the electropositive metal plated on the surface of the component as a result of electrolytic displacement reaction, in which the second molten salt acting as solvent is an essentially pure alkaline hydroxide.

23. A method for manufacturing a device including a component comprising metals or metal alloys, including:
- immersing of the surface of the component in a first molten salt which acts as a flux to dissolve refractory oxide on said component;
- removing the component from the first molten salt with salt adhering to the surface which then rapidly solidifies and acts as a shield to retard re-oxidation of the surface; and
- immersing the component in a second molten salt containing dissolved ions of a metal more electropositive than the metals or metal alloys of the component to obtain a layer of the electropositive metal plated on the surface of the component as a result of electrolytic displacement reaction, in which the second molten salt comprises a low melting mixture of two or more essentially pure hydroxide salts.

24. The method of claim 23 in which the second molten salt acting as solvent is a eutectic mixture of sodium hydroxide and potassium hydroxide.

25. The method of claim 23 in which the second molten salt acting as solvent is a eutectic mixture of lithium hydroxide and potassium hydroxide.

26. The method of claim 14 in which the electropositive metal comprises tin.

27. The method of claim 14 in which tin-containing ions are introduced into the solvent second molten salt by dissolving a tin compound in said molten salt.

28. A method for manufacturing a device including a component comprising metals or metal alloys, including;
- immersing of the surface of the component in a first molten salt which acts as a flux to dissolve refractory oxide on said component;
- removing the component from the first molten salt with salt adhering to the surface which then rapidly solidifies and acts as a shield to retard re-oxidation of the surface; and
- immersing the component in a second molten salt containing dissolved ions of a metal more electropositive than the metals or metal alloys of the component to obtain a layer of the electropositive metal plated on the surface of the component as a result of electrolytic displacement reaction, in which tin-containing ions are introduced into the solvent second molten salt by dissolving a tin compound in said molten salt, and wherein the tin compound is tin oxide containing tin in a tetravalent ionic state.

29. A method for manufacturing a device including a component comprising metals or metal alloys, including:
- immersing of the surface of the component in a first molten salt which acts as a flux to dissolve refractory oxide on said component;
- removing the component from the first molten salt with salt adhering to the surface which then rapidly solidifies and a shield to retard re-oxidation of the surface; and
- immersing the component in a second molten salt containing dissolved ions of a metal more electropositive than the metals or metal alloys of the component to obtain a layer of the electropositive metal plated on the surface of the component as a result of electrolytic displacement reaction in which tin-containing ions are introduced into the solvent second molten salt by dissolving a tin compound in said molten salt, and wherein the tin compound is tin oxide containing tin in a divalent ionic state.

30. The method of claim 14, including soldering the component to another member.

* * * * *